May 6, 1924.
W. HUGHES
SAFETY SEAL FOR LOCKS
Filed March 15, 1921
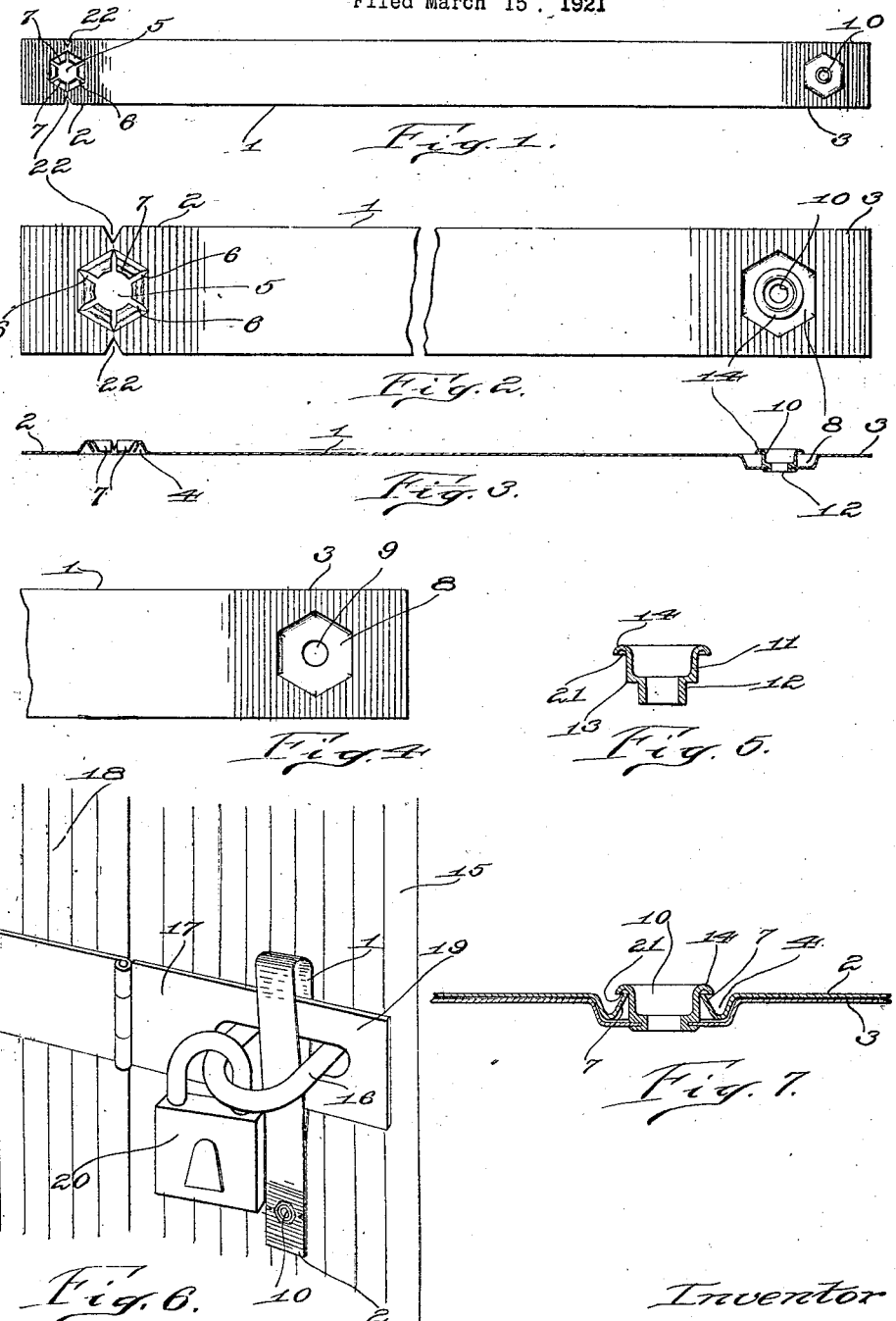
Inventor
William Hughes
By Macleod, Calver, Copeland & Dike
Attys.

Patented May 6, 1924.

UNITED STATES PATENT OFFICE.

WILLIAM HUGHES, OF TAUNTON, MASSACHUSETTS.

SAFETY SEAL FOR LOCKS.

Application filed March 15, 1921. Serial No. 452,480.

*To all whom it may concern:*

Be it known that I, WILLIAM HUGHES, a citizen of the United States, residing at Taunton, county of Bristol, State of Massachusetts, have invented a certain new and useful Improvement in Safety Seals for Locks, of which the following is a specification, reference being had therein to the accompanying drawings.

The object of the invention is to provide a very simple and cheap safety seal for use with locks. It is especially intended for application to car doors, but it is also equally applicable to other doors; also to trunks, boxes, and the like in which a staple is employed as a part of the locking means.

The invention will be fully understood from the following description when taken in connection with the accompanying drawings, and the novel features thereof will be pointed out and clearly defined in the claims at the close of this sepcification.

In the drawings, Fig. 1 is a plan view of a device embodying the invention in a straightened-out form, viewing the outer face.

Fig. 2 is a plan view of the inner face of the device shown in Figure 1.

Fig. 3 is a longitudinal section of Figure 1.

Fig. 4 is a plan view of a portion of the strip blank after it is stamped out to form the recesses in the end portions before the tubular stud in connected with it.

Fig. 5 is a sectional view of the stud member before it is assembled with the strip.

Fig. 6 shows the device inserted through the staple of a car door lock after a hasp has been connected with the staple and a padlock has also been connected with the staple.

Fig. 7 is a sectional view showing the interengaging members of the locking seal in the final locking and sealing position.

Referring now to the drawings, the sealing device comprises a strip 1 of flexible metal which can be slipped through the staple or other loop member of the fastening of the door and which can then be bent into loop form so as to bring the two ends together in a lapping relation, the two ends being formed with interengaging portions which can be snapped together, the interengaging portions of the two ends being such that after once being engaged, they cannot be separated without breaking the seal.

The body 1 is preferably made of soft steel which can be easily bent and which is hardened at the two opposite end portions for some distance back from the ends, said hardened portions 2 and 3 respectively being hardened in such a manner that one of said hardened end portions, as 2, is frangible so that, although it is hard, it will break easily.

Said end portion 2 is stamped so as to form a countersunk recess 4 of non-circular contour, preferably polygonal. In the drawings, it is shown as being hexagonal. A hole 5 is punched through the middle of the recess, and radial slits 6 are formed extending from the corners formed by the intersection of the sides of the polygonal recess radially inward from the central opening 5. There are thus formed a plurality of hook-shaped lips 7 which, in the stamping out of the recess, are bent so as to incline inwardly and upwardly from the bottom of the recess.

At the opposite end of the strip 1, there is stamped out a countersunk recess 8, which is countersunk from the opposite face from that from which the countersunk recess 4 at the first end was made, and of similar contour. A hole 9 is formed in the bottom of the said countersunk recess and centrally therewith, and a stud 10 is riveted therein. Said stud is preferably formed with a post 11 terminating at one end in a reduced portion 12, thus forming a shoulder 13 at the junction of the reduced portion 12 and the larger portion 11. The reduced portion of the post is passed through the hole from the countersunk side and is riveted or headed down on the opposite side so as to securely fasten it to the body member of the seal.

The other end of the post terminates in a head or flange portion 14 which is curved toward the face of the body member of the fastener something like the curve of a hat brim.

Preferably the stud 10 is tubular, as shown, but this is not essential to the invention. The tubular form is, however, more convenient of construction.

To illustrate the use of the invention, 15 indicates a door in which is fastened a staple 16. A hasp 17 is connected with the door casing 18 and is formed with a loop 19 which engages with the staple 16. The bow of a padlock 20 is then passed through the staple and is fastened or locked in the ordinary manner.

The sealing strip is then passed through the staple and bent around over the hasp to bring the two ends into overlapping relation as shown in Figure 6, and then the flange head 14 of the post 11 is pushed through the opening between the lips 7, said lips yielding by reason of the flexible character of the metal and of the slits between the lips to permit the said flange head to pass through, but the said lips will spring back and will engage with the groove 21 formed by the curved flange 14 of the post head, so that it will be impossible for the flange of the post to be pulled back through the hole of the socket. The two members at the two ends of the strip thus form a sort of ball and socket snap fastener connection, but it differs from the ordinary ball and socket connection from the fact that the lips 7 of the socket member hook over the rim of the flange 14 of the stud member 10 and therefore prevent retraction. The only way in which they can be separated is by actually breaking the seal. For this reason, the end portion 2 of the strip in which the socket member is formed is made frangible so that it will break when any attempt is made to separate the two fastening members from each other.

In order to make the socket end still more frangible, there are preferably formed notches 22 extending in from the side edges of the strip.

What I claim is:—

1. A safety seal comprising a strip of flexible material having one end portion formed with a socket provided with spring hooks struck up from the body of the metal and having at its other end a post with a flanged head, said post being mounted in the bottom of a non-circular recess in said strip, said spring hooks being folded in their middle, said hooks being disposed in noncircular form similar to the contour of the recess in which the post is seated, so that, when a flexible strip is bent to bring the two end portions into overlapping relation and they are pressed together, the folds of said hooks will be seated within said recess and the free ends of said hooks will engage with the flange on said post.

2. A safety seal comprising a strip of flexible material having one end portion formed with a socket provided with spring hooks and having at its other end a post with a flanged head, said post being mounted in the bottom of a polygonal recess in said strip, and said spring hooks being folded in their middle, each of said hooks forming one side of a polygon of similar contour to the contour of the recess in the other end of the strip but of slightly smaller size, so that when the flexible strip is bent to bring the two end portions into overlapping relation and they are pressed together, the folds of said hooks will be seated within said recess and the free ends of said hooks will engage with the flange on said post.

3. A safety seal comprising a strip of flexible metal which is capable of being flexed to bring two end portions into overlapping relation to each other, one of said end portions being formed with a hole embordered by a plurality of spring hooks struck up from the metal around the margin of said hole with slits between said hooks, said hooks being folded over midway of their length to form a fold which projects above the surface of the strip, said hooks being arranged so that they form the sides of a polygon with slits between the sides, the other end of the strip being formed with a recess of similar contour to that of the periphery of the combined hooks, a post mounted in said recess having a flanged head which is adapted to be snapped into interlocking engagement with the free ends of said hooks when the two end portions of the strip are brought into overlapping relation to each other, the polygonally arranged folds of said hooks engaging with the polygonal recess in the other end of the strip.

In testimony whereof I affix my signature.

WILLIAM HUGHES.